Figure 1:
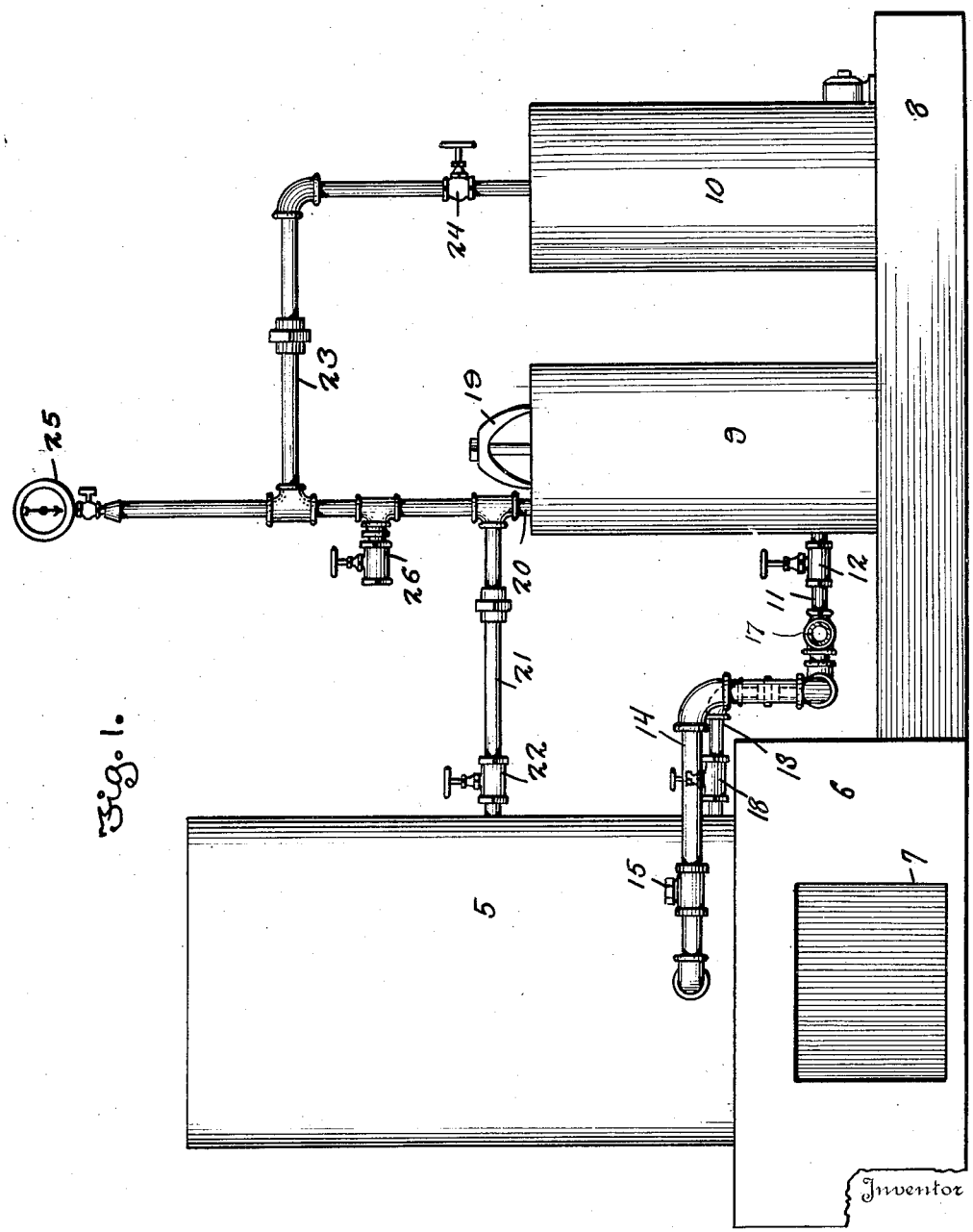

June 3, 1930.    A. SORENSEN    1,761,500
FLOAT IMPREGNATING PROCESS AND APPARATUS
Filed June 1, 1926    2 Sheets-Sheet 1

Witnesses
C. C. Churchman
J. Stanley Burch

Inventor
Anton Sorensen
By Richard B. Owen
Attorney

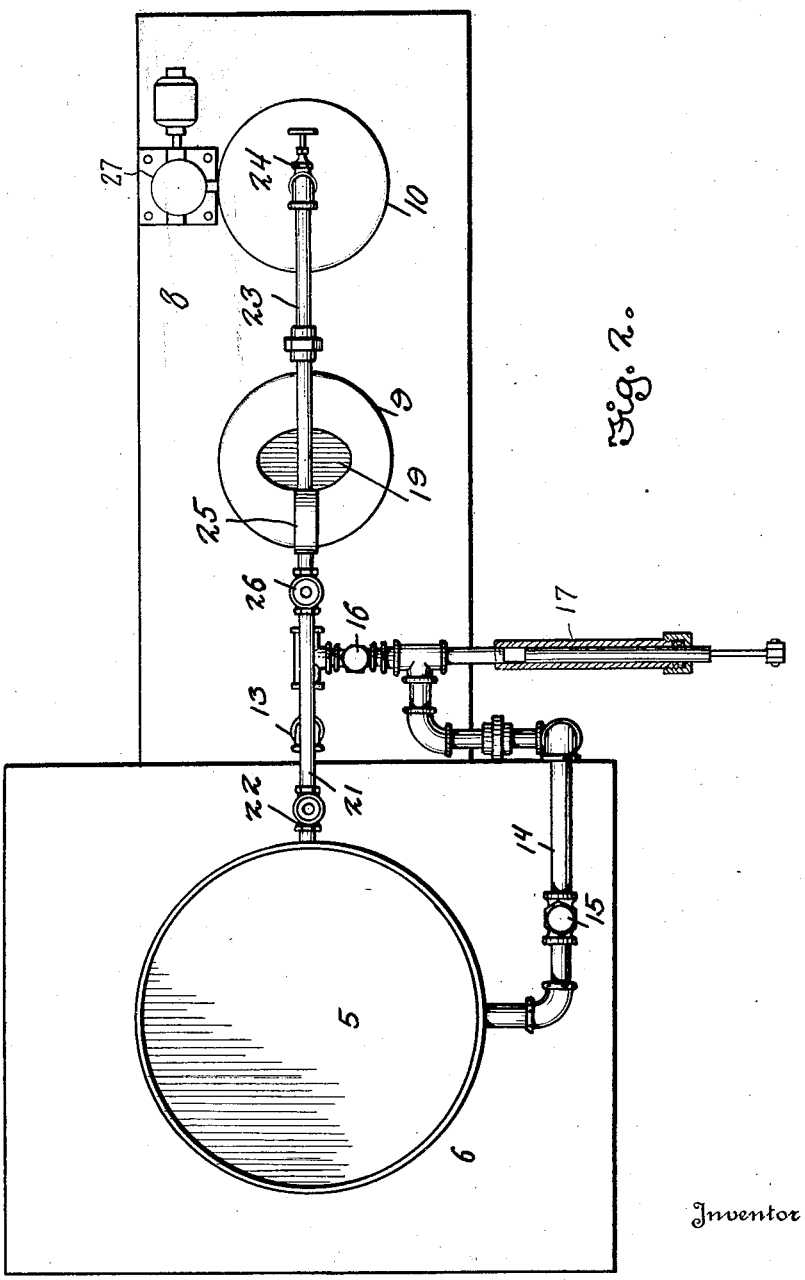

Patented June 3, 1930

1,761,500

UNITED STATES PATENT OFFICE

ANTON SORENSEN, OF ASTORIA, OREGON

FLOAT IMPREGNATING PROCESS AND APPARATUS

Application filed June 1, 1926. Serial No. 112,991.

This invention relates to a new and useful process of and apparatus for impregnating fishing net floats and the like with water resisting or water proofing material.

The present invention has particular reference to the treatment of wooden floats such as are commonly used on fishing nets where the nets are maintained in the water in a vertical position by the provision of the floats along the upper edge of the net and weights on the lower edge thereof. These floats are now treated with water resisting or water proofing material, such as oil, paraffin, wax or the like, in order to prevent them from becoming water-logged and useless, such treatment simply consisting in soaking the floats in hot paraffin, oil or wax. When the floats are treated in this conventional manner, a water proofing coating is merely provided thereon, and this coating ultimately wears off and the floats become somewhat water-logged and are thereby rendered useless.

The primary object of the present invention is to provide means for impregnating or permeating the wooden floats with the water proofing material so that said floats will not readily become water-logged and will therefore be capable of long continued operative use.

Briefly described, the present invention aims to subject the floats to a bath, of water proofing material in a heated liquid state and under pressure, so that the water proofing material thoroughly impregnates the entire float for effectively preventing the same from becoming useless or water-logged after considerable use.

An object of the invention is to provide a simple, durable and efficient apparatus for effectively permeating the floats with water proofing material, in accordance with the present method, whereby the process may be expeditiously and effectively carried out at a minimum expense.

Other objects will appear as the nature of the invention is better understood, and the same consists in the novel process and apparatus therefor, hereinafter more fully described, illustrated in the accompanying drawings and claimed.

Referring more in detail to the drawings,

Figure 1 is a side elevational view, partly broken away, of a float impregnating apparatus constructed in accordance with the present invention, the pump being removed; and Figure 2 is a top plan view thereof with the pump shown in section.

Referring more in detail to the drawings, the present apparatus includes a relatively large tank 5 adapted for reception of the water proofing material, such as wax, paraffin or the like, and preferably open at the top, suitable means being provided for facilitating application of heat to the bottom of the tank whereby the material may be heated and melted to assume a liquid state. As shown, the tank 5 is arranged upon a supporting base 6 having a fire pit in which a fire may be built for applying the heat to the bottom of the tank 5, access being had to this fire pit through a side door or opening 7.

The base 6 may be provided with a small extension 8 upon which are mounted a pair of smaller tanks 9 and 10, and it will be seen that the tank 9 which is nearest the main or largest tank 5 is disposed with its bottom portion below the bottom of the tank 5 and with its top portion considerably below the top of the tank 5.

A pipe 11 equipped with a globe or equivalent control valve 12 communicates with the tank 9 near the bottom thereof, and this pipe is provided with two branches 13 and 14 which communicate with the tank 5 near the bottom of the latter. The branch 14 contains a pair of check valves 15 and 16 which are adapted to automatically open for permitting the free flow of the water-proofing material from the tank 5 to the tank 9 under certain conditions as will presently become apparent, although adapted to automatically close for preventing backward flow of the water-proofing material through the branch 14 from the tank 9 to the tank 5. Suitable means is provided for supplying additional water proofing fluid under pressure to the tank 9 from tank 5 through the branch 14, and this means may consist in the provision of a conventional hand force pump 17 having its outlet in connection with the pipe 14 between the check valves 15 and 16 as shown clearly in Figure 2. It is thus apparent that when the piston of pump 17 is drawn outwardly the fluid is drawn into the branch 14 past valve 15, and when the piston of the pump 17 is forced inwardly, such fluid is forced past valve 16 into the tank 9 while being prevented from passing to the tank 5 through the branch 14 by the check valve 15 when the pump is idle.

The branch 13 is provided with a suitable globe or other control valve 18 adjacent the tank 5.

As shown, the tank 9 has a cover adapted for removal for facilitating access to the interior of said tank. The securing means for this cover is indicated generally at 19 and is of the conventional type employed for securing covers of hand holes in place. Thus, when the cover is effectively secured in place, the tank is adapted to be airtight. A pipe 20 communicates with the top of the tank 9 and has a horizontal branch 21 which extends to and communicates with the tank 5 intermediate the top and bottom thereof as shown clearly in Figure 1, such branch 21 being equipped with a suitable globe or other control valve 22. The pipe 20 has a further branch 23 which extends to and communicates with the top of the airtight tank 10, and a suitable globe or control valve 24 is provided in this branch 23 adjacent the top of the tank 10, as shown. A pressure gage 25 has its inlet placed into communication with the branch 23 at a point between the branch 21 and the valve 24, and said branch 23 is provided with an exhaust port at a point between the branch 21 and the connection of the pressure gage 25 with the branch 23, such exhaust port being equipped with a suitable globe or hut off valve 26.

In operation, the wax or other water-proofing material is placed in the tank 5 and melted or reduced to a substantially liquid state by heat produced by the fire under said tank 5. The fishing net floats are then placed into the tank 5 so as to be subjected to a bath of the heated water-proofing material. The floats are left in the water-proofing material within the tank 5 until thoroughly heated or until all the moisture is driven out of them. These floats are then removed from the tank 5 and then placed in the tank 9, after which the cover of the tank 9 is securely fastened in place to render said tank 9 airtight. The valves 12, 18 and 22 are then opened, and the heated water-proofing material immediately flows by gravity into the tank 9 so as to fill the latter and overflow through the branch pipe 21. The valves 12, 18 and 22 are then tightly closed and the valve 24 is opened so as to admit air under pressure into the top of the tank 9 from the tank 10 and through the branch pipe 23. It is thus evident that the tank 10 is adapted for storage of air under pressure, the pressure being suitably kept at about one hundred pounds as indicated by the gage 25. The air may be supplied to the tank 10 by a suitable motor-operated compressor 27. After the pressure has been admitted into the top of the tank 9 by opening the valve 24, said valve 24 is closed and the pressure in the tank 9 is increased to approximately one hundred and fifty pounds by supplying an additional quantity of the fluid from tank 5 through operation of the pump 17 with the valve 12 open. This increased pressure is maintained for about thirty minutes so as to allow sufficient time for the water-proofing material to completely saturate or impregnate the ordinary floats now in common use. After the floats have been subjected to the bath under pressure in the tank 9 for the above mentioned period, the valve 18 is opened as is also the valve 24, the valve 12 being previously opened while using the pump 17. When this is done the air under pressure from the tank 10 forces the water-proofing material from the tank 9 through the branch 13 back into the main tank 5, whereby the tank 9 is emptied for permitting ready access to the floats for facilitating their removal from the tank 9. However, after the water-proofing material is forced from the tank 9 back to the tank 5, the valve 12 will be closed and the exhaust valve 26 opened prior to opening the cover of the tank 9 so that all air pressure will be exhausted prior to attempting to gain access to the floats for removal of the same from the tank 9.

From the foregoing descritpion it will be seen that the present apparatus is simple and durable in construction as well as efficient in operation for carrying out the method embodied in the present invention. It will also be clearly seen that such method generally embraces the subjection of the floats first to a bath in heated water-proofing material in the absence of pressure, and then subjecting such floats to a second bath in the heated water-proofing material in the presence of pressure or air under pressure. However, the process of course includes specific steps such as initially introducing a given pressure and subsequently increasing this pressure during the step of subjecting the floats to a bath in the tank 9.

It has been found that when the floats are treated in this manner they are thoroughly impregnated or saturated throughout with the water-proofing material, whereby the floats may be placed into long continued use without danger of becoming useless from becoming water-logged or the like.

Minor changes may be made without departing from the spirit and scope of the invention as claimed.

What I claim as new is:—

1. The process of impregnating articles with a fluid which comprises immersing the articles in the fluid, in the presence of heat, to effect initial impregnation of the articles with the fluid, separating the articles from the fluid, immersing the articles in another bath of the fluid in an airtight compartment, creating a pressure upon the fluid in said compartment to effect further impregnation of the articles by the fluid, delivering an additional volume of the fluid under pressure into the body of fluid under air pressure in said compartment to effect further impregnation of the articles by the fluid, cutting off the supply of additional fluid, relieving the impregnating fluid of the air pressure, and separating the said fluid from the articles.

2. An impregnating apparatus comprising a chamber for the reception of impregnating material, a second chamber having an airtight removal closure, valve controlled means for conveying a quantity of the material from said first chamber to said second chamber, a source of compressed air supply, valve controlled means for admitting air from said source to said second chamber to create a pressure on the material therein, and means for forcing an additional quantity of the material from said first chamber into said second chamber while maintaining the pressure in said second chamber.

In testimony whereof I affix my signature.

ANTON SORENSEN.